C. W. BALDWIN.
Valve Gear for Hydraulic Elevators.
No. 202,215. Patented April 9, 1878.
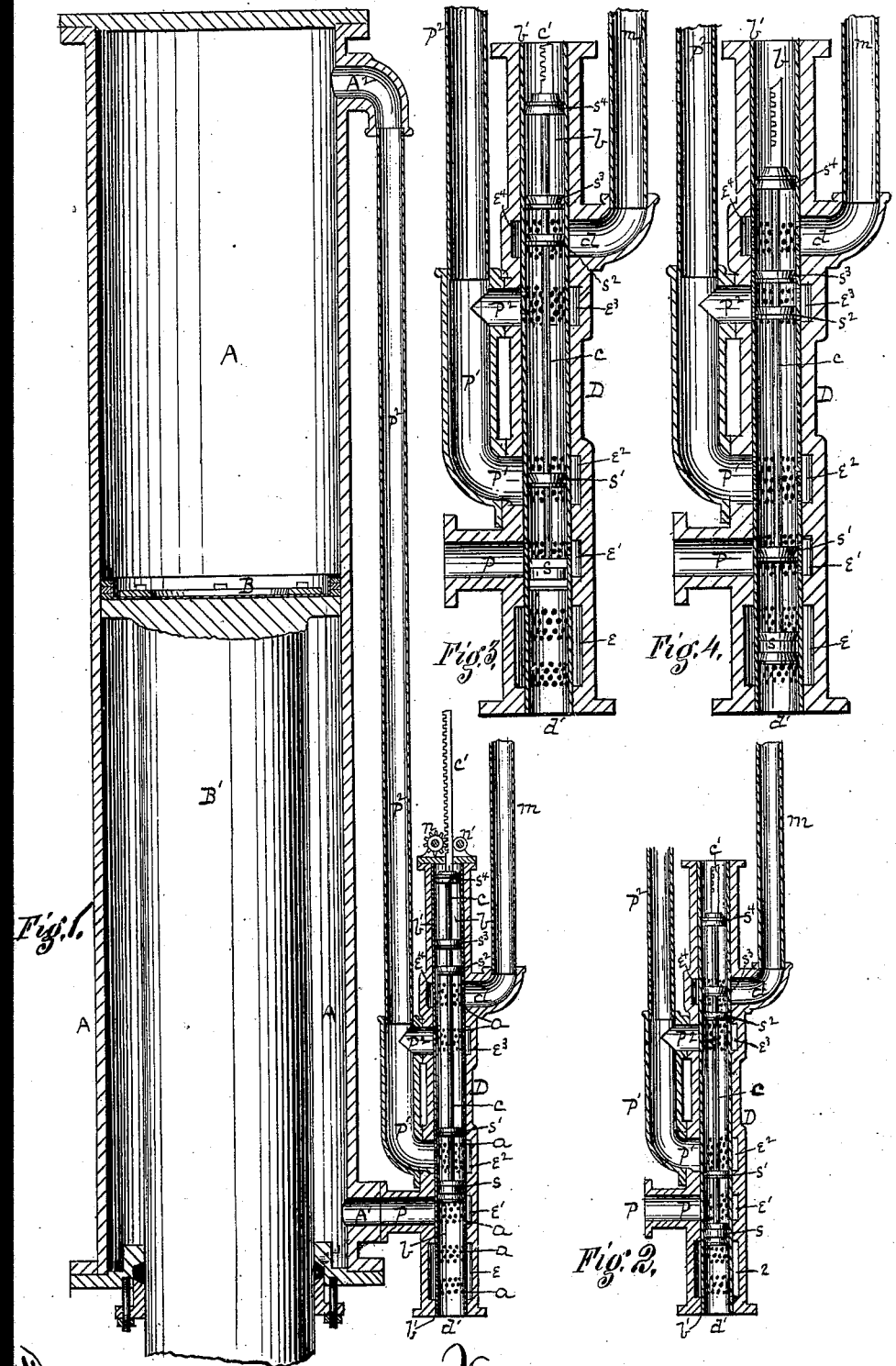

UNITED STATES PATENT OFFICE.

CYRUS W. BALDWIN, OF BROOKLYN, NEW YORK.

IMPROVEMENT IN VALVE-GEARS FOR HYDRAULIC ELEVATORS.

Specification forming part of Letters Patent No. 202,215, dated April 9, 1878; application filed January 30, 1878.

*To all whom it may concern:*

Be it known that I, CYRUS W. BALDWIN, of Brooklyn, county of Kings, State of New York, have invented or discovered a new and useful Improvement in Valve-Gear for Hydraulic Elevators; and I do hereby declare the following to be a full, clear, concise, and exact description thereof, reference being had to the accompanying drawing, making a part of this specification, in which—like letters indicating like parts—

Figure 1 is a longitudinal sectional view of so much of my improved apparatus as is necessary to illustrate its construction and operation; and Figs. 2, 3, and 4 (the latter being made to an enlarged scale) are like views of the valve-gear detached from the operating-cylinder and illustrative of different positions of the valves for different operative purposes.

My improvement, while capable of other useful applications, is especially designed for use in that class of elevators in which a car is connected by a flexible suspensory rope, strap, or chain, directly or indirectly, with a ram, plunger, or piston-stem, the piston or head of which latter is operated with greater or less force by variations of fluid-pressure on its opposite sides.

In the drawing hereto annexed the cylinder is represented at A, the ram, plunger, or piston-stem at B', and the head or piston at B. These parts are of any suitable construction, form, or proportions. Water enters and leaves the cylinder on opposite sides of the piston by ports A¹ A². Pipes P P¹ P² lead from these ports to and open into a valve case or box, D, the pipe P¹ opening at its other end into the pipe P² as shown. This valve-case has a chamber, b, preferably of tubular form, as shown, and also, by preference, having a lining, b', the better to secure the close working of the valves, and also for convenience in providing strainers as shown at a a, to cover the lateral supply and discharge ports, and thereby exclude such solid matter as would be likely to work injury, and also to admit the water in small streams, so as to shut it off gradually and prevent shock to the machinery.

In the valve-chamber, on a common stem, c, I arrange a series of valves, s, s¹, s², s³, and s⁴, suitably packed to prevent leakage, preferably by a cup-leather packing, and in about the order shown with reference to each other, and with reference to the pipe-ports P P¹ P², the main supply-port d, and the main discharge d', the latter being, either through the end of the valve-chamber or through a pipe, connected with the annular chamber e, which surrounds the contiguous strainer-ports a. Like annular chambers $e^1$, $e^2$, $e^3$, and $e^4$ are also made around the other strainer-ports a, and such chambers have open communication with the pipes or pipe-ports P, P¹, P², and d, respectively.

The valve-stem c projects at one end through a cap on the end of the valve-chamber, and terminates in a toothed rack, c', to which, by means of a pinion, n, and back-support or friction-guide n', the power to shift the valves is applied; and for this purpose an operating-cord may lead from the car and pass around a wheel on the pinion-shaft in any of the ways known to the art, so as to enable the attendant in the car to shift the valves as he may desire with reference to starting in either direction, stopping, or moving with a light or heavy load.

The operation of this apparatus will now be readily understood on reference to the various figures. With the valves set or adjusted as in Fig. 1, water-pressure, acting from any suitable head or supply through pipe m, enters the valve-chamber through the port d, between the valves $s^1$ and $s^2$, passes out through the pipe-port and by the pipe P², (such port being between the same valves,) through cylinder-port A², into the cylinder A on the side of the piston B opposite to that at which the plunger or stem is connected, so as to secure a maximum of effect.

Thus the full water or other fluid pressure is exerted on the full area of the piston. The water-pressure which acts back through the pipe P¹ produces no effect, and is a source of no loss, since the port of this pipe communicates with the space between the valves s and $s^1$, whereby these valves, like $s^1$ and $s^2$, are in perfect balance by water-pressure. At the same time water previously admitted on the opposite side of the piston B will be free to escape by the port A¹ through P and d', the position of the valve $s$ permitting such free escape. In this way the elevator works with its maximum force in raising a car with a heavy load.

To stop the car in either its ascent or descent, the attendant in the car, by shifting his operating-cord, shifts the valves to the position shown in Fig. 2. The valve $s^2$ cuts off communication from $d$ to $P^2$, so as to cut off the supply, and the valve $s$ closes the discharge. Also, communication from one side of the piston to the other is prevented by the valve $s^1$, which comes between the ports P and $P^1$. The valves are all balanced as before. The car must necessarily stop.

In Fig. 3 I have shown the proper adjustment of the valves (effected in the same way) when it is only desired to raise the empty car, or with a light load. In this adjustment the valve $s$ still closes the discharge; but it also partly covers the port P. The valve $s^1$ also uncovers in part the port $P^1$, and the valve $s^2$ partly uncovers the main supply-port $d$. As a result of this adjustment the main supply is partly cut off, or, as it may be termed, is "choked"; and the waste-water from below the piston passes, by port P and the space between the valves $s$ and $s^1$, into port and pipe $P^1$, thence into pipe $P^2$, and, with the limited supply under pressure received from $d$ and through port $P^2$, enters the cylinder by port $A^2$. Hence the piston B is balanced or *in equilibrio* to the extent of its area on opposite sides, and the effective force of the water-pressure admitted through the ports $d$ and $P^2$ is limited to an area of the exposed face of the piston represented by or equal to the area in cross-section of the plunger $B^1$. The effective force being limited and the main supply partly cut off, this adjustment is the preferable one for raising a light load.

When it is desired to lower the car, it is only necessary to shift the valves, in the manner before indicated, to the position indicated in Fig. 4. The valve $s^3$ then cuts off the main supply entirely; also, the valve $s^1$ occupies an intermediate position on the port P, and the valve $s$ chokes the discharge or waste. The car is intended to descend by its own weight; but, to permit it to do so, water must pass out at $A^2$ and in at $A^1$. This is provided for by the pipe $P^1$, since it permits a regular flow of water from $A^2$ through pipe $P^2$ $P^1$, and communicating-ports into P and $A^1$; but, as more water must pass out at $A^2$ than can enter at $A^1$, a portion is permitted to escape from P around the valve $s$. By varying slightly the position of the valves the flow from $P^1$ to P, and from P to the waste, may be more or less cut off or choked, whereby the rapidity of the descent of the car may be regulated. In this adjustment, as in the previous ones, the valves are balanced as against water-pressure.

The pipe $P^1$, with its end connecting-ports, is, in effect, a by-path or conduit, going past the pipe-port $P^2$, so as to bring the conduit or pipe $P^2$ into communication with P when it is desired that water should pass from one side of the piston to the other, either while the main supply is wholly or only partially cut off.

If the performance of all the functions described is not desired, some of the valves may be omitted.

The valve $s^4$ is important for balancing purposes, and as a substitute for a stuffing-box, and may be omitted if a stuffing-box or stem-packing is used, and balancing at that point is not deemed necessary. The spacing and number of the valves will be regulated, in part at least, by the spacing and number of ports to be covered and uncovered thereby.

I claim herein as my invention—

1. In a hydraulic-elevator apparatus, the combination of a hollow cylinder, having outlet and inlet ports at or near its ends, a piston working therein between such ports, an operating stem, plunger, or ram connected to the piston, a valve-case containing main supply and discharge ports, two ports connected with one cylinder-port, a third port connected with the other cylinder-port, and an arrangement of piston-valves, substantially as set forth, for covering and uncovering such ports with reference to raising, lowering, and stopping the car.

2. The by-pipe and port $P^1$, connecting at one end with the main conduit $P^2$, and at its other end with the valve-chamber in relationship to the port P, substantially as described, whereby, in connection with a piston valve or valves, communication may be established between the opposite ends of the cylinder for the flow of water from one side of the piston to the other.

3. A series of piston-valves arranged on a common stem in a valve-case, and suitably spaced with reference to main supply and discharge ports $d$ $d^1$, and three intermediate ports, two of which communicate with the port of a hydraulic-elevator cylinder, and the third with the other, substantially as set forth.

4. In combination with cylinder, piston, piston-stem, valve-case, and connecting pipes and ports, a valve device arranged by a single throw or motion to close the supply and bring the discharge into communication with both of the end cylinder-ports, whereby a portion of the water in one end of the cylinder will be free to pass into the other end and the residue to escape, substantially as set forth.

5. In combination with a cylinder piston and stem, a valve-case having at least two ports and pipe-connections thence to the cylinder-ports, and a valve device, substantially as described, arranged to close the discharge entirely, or to bring it into communication with the supply, in either case operating by a single motion or stroke.

6. Valves $s$ $s^1$ $s^2$, arranged, substantially as described, with reference to the supply and discharge ports, and a system of ports and pipes leading to the opposite ends of a hydraulic cylinder, and from one end of such cylinder to the other, whereby all ports may be closed simultaneously by a single throw or motion of the valves, substantially as described.

In testimony whereof I have hereunto set my hand.

CYRUS W. BALDWIN.

Witnesses:
 MARCUS NEWBURG,
 JOHN W. GOFF.